(12) United States Patent
Meyer et al.

(10) Patent No.: US 8,567,469 B2
(45) Date of Patent: Oct. 29, 2013

(54) ELASTIC FIBER LAYING DIE, LAYING DEVICE COMPRISING SUCH A DIE, AND USE OF SAID DEVICE

(75) Inventors: Oliver Meyer, Ottobrunn (DE); Stephan Schoppe, Selters/Ts (DE)

(73) Assignee: EADS Deutschland GmbH, Ottobrunn (DE)

( * ) Notice: Subject to any disclaimer, the term of this patent is extended or adjusted under 35 U.S.C. 154(b) by 879 days.

(21) Appl. No.: 12/530,861

(22) PCT Filed: Mar. 13, 2008

(86) PCT No.: PCT/EP2008/053048
§ 371 (c)(1),
(2), (4) Date: Sep. 11, 2009

(87) PCT Pub. No.: WO2008/110615
PCT Pub. Date: Sep. 18, 2008

(65) Prior Publication Data
US 2010/0084098 A1    Apr. 8, 2010

(30) Foreign Application Priority Data
Mar. 13, 2007  (DE) .......... 10 2007 012 609

(51) Int. Cl.
*B28B 7/32* (2006.01)

(52) U.S. Cl.
USPC ......... 156/583.3; 156/540; 156/539; 156/581

(58) Field of Classification Search
USPC ................. 156/583.3, 539, 540, 581
See application file for complete search history.

(56) References Cited

U.S. PATENT DOCUMENTS

| | | | |
|---|---|---|---|
| 2,057,538 A | 10/1936 | Petersen | |
| 2,394,657 A | 2/1946 | Beregh | |
| 2,489,846 A | 11/1949 | Ammerall | |
| 2,613,633 A | 10/1952 | Dreesen | |
| 3,518,810 A | 7/1970 | Steeves | |
| 4,408,558 A * | 10/1983 | Faber et al. | 118/59 |
| 4,511,425 A * | 4/1985 | Boyd et al. | 156/493 |
| 5,092,954 A | 3/1992 | Braun et al. | |
| 5,482,775 A * | 1/1996 | Miyabayashi | 428/391 |
| 5,935,474 A * | 8/1999 | Grischenkov et al. | 219/549 |
| 6,032,342 A | 3/2000 | Kawabe et al. | |
| 2005/0061422 A1* | 3/2005 | Martin | 156/230 |
| 2005/0112384 A1* | 5/2005 | Bachmann | 428/447 |
| 2005/0172465 A1 | 8/2005 | Duval | |

FOREIGN PATENT DOCUMENTS

| | | |
|---|---|---|
| DE | 715801 C | 1/1942 |
| DE | 30 03 666 A1 | 8/1981 |
| DE | 196 24 912 A1 | 1/1997 |
| DE | 695 00 513 T2 | 12/1997 |

(Continued)

OTHER PUBLICATIONS

Office Action of the corresponding Chinese Patent No. 200880015853.3, dated Dec. 16, 2011.

(Continued)

*Primary Examiner* — Jeff Aftergut
*Assistant Examiner* — Jaeyun Lee
(74) *Attorney, Agent, or Firm* — Global IP Counselors, LLP

(57) ABSTRACT

A laying device (28) that is configured to lay fiber pieces (40, 40', 40") has a flexible surface (164) that applies and presses the fiber pieces against a preform surface.

24 Claims, 8 Drawing Sheets

(56) References Cited

FOREIGN PATENT DOCUMENTS

| | | | |
|---|---|---|---|
| DE | 197 26 831 | A1 | 1/1999 |
| DE | 100 05 202 | A1 | 11/2000 |
| EP | 0 392 974 | A2 | 10/1990 |
| EP | 0 512 126 | A1 | 1/1992 |
| EP | 0 491 353 | A1 | 6/1992 |
| EP | 1 749 631 | A1 | 2/2007 |
| WO | WO-03/100148 | A1 | 12/2003 |

OTHER PUBLICATIONS

Office Action of the corresponding European Patent No. 08 717 792.9, dated Jan. 25, 2012.

Office Action of the corresponding German Patent Office Action No. 10 2007 063 689.1, dated Jul. 17, 2012.

* cited by examiner

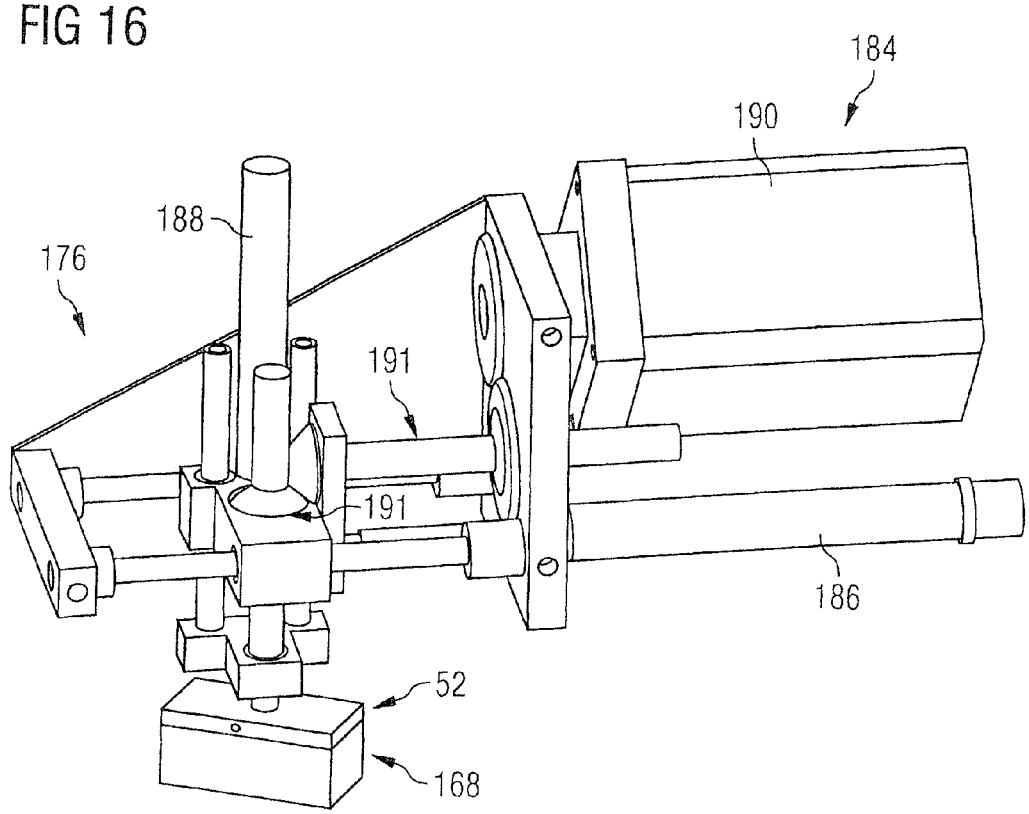

ELASTIC FIBER LAYING DIE, LAYING DEVICE COMPRISING SUCH A DIE, AND USE OF SAID DEVICE

CROSS-REFERENCE TO RELATED APPLICATIONS

This U.S. National stage application claims priority under 35 U.S.C. §119(a) to German Patent Application No. 10 2007 012 609.5, filed in Germany on Mar. 13, 2007, the entire contents of which are hereby incorporated herein by reference.

BACKGROUND OF THE INVENTION

Field of the Invention

The invention relates to a laying device for laying fiber pieces. The invention also relates to a laying die for use in the laying device. The laying device according to the invention is particularly suitable for use in a process of manufacturing a preform for a load path aligned fiber composite structure.

At the construction of vehicles of all kinds, particularly at the construction of aircrafts and spacecrafts, but also in other branches of industry such as mechanical engineering, there is an increasing need for strong and yet lightweight, cost-efficient materials. Especially fiber composite materials offer an outstanding lightweight construction potential. The principle resides in the fact that particularly high-strength and stiff fibers are embedded in a matrix in a load path aligned fashion, thus producing components having outstanding mechanical properties by using previous techniques and having a weight which at a comparable performance is typically 25% less than that of aluminum structures and 50% less than steel structures. A drawback is the high material costs and particularly the laborious and mainly manual fabrication.

Accordingly, there is a desire for an automated manufacture facilitating machine positioning of the fibers in space.

To produce fiber composite structures with load path aligned fibers, so-called preforms as textile semi-products have been manufactured for selected applications. These are mostly two- or three-dimensional structures having a load path aligned fiber orientation. For this purpose, endless fibers are laid in the direction of the load by using devices from textile engineering and are usually prefixed by sewing, knitting or similar techniques also performed with the aid of devices from textile engineering. Examples of devices and processes for manufacturing such preforms are described in DE 30 03 666 A1, DE 196 24 912, DE 197 26 831 A1 and DE 100 05 202 A1.

However, the known processes for manufacturing preforms are complicated concerning their implementation and process technique. Particularly for components where curved load path lines with a varying density are to be expected, it is not possible with previous processes to manufacture a correspondingly load path aligned component. Particularly, the fibers cannot be oriented arbitrarily along defined curved paths and the fiber content cannot be locally varied.

SUMMARY OF THE INVENTION

Accordingly, it is an object of the invention to provide a device for use in the manufacture of textile semi-products for load path aligned fiber composite structures with which the fibers can be better adjusted to complicated load paths.

This object is achieved by a laying device according to a first aspect of the invention.

A laying die for use in such a laying device and a beneficial use in a process for manufacturing fiber composite structures are the subject of other aspects. Advantageous embodiments of the invention are the subject of the other aspects.

According to the invention, a laying device for laying fiber pieces with an elastically deformable surface for pressing fiber pieces in a two-dimensional fashion against a three-dimensional forming surface is provided.

Such a device allows for example the placement of fiber pieces along arbitrary surface geometries, for example even along three-dimensional curved surface structures.

In a process for manufacturing textile semi-products in which the laying device can be preferably employed, a preform can be produced in such a way that first of all a bundle of fiber filaments, preferably a roving, is spread into a flat form. From this spread bundle of fiber filaments a fiber band piece, in the following also referred to as a patch, is cut off preferably in a predefined length. Thereafter the fiber band piece is picked up and placed at a predefined position by means of a laying device. There the fiber piece is fixed by means of a binder material. The cutting, placement and fixing of fiber band pieces is repeated, with the fiber band pieces being placed and fixed at different predefined positions. This preferably takes place in such a manner that the desired preform having a corresponding load path aligned fiber orientation is formed from several patches fixed adjacent to each other and/or to possible other component parts of the preform. Thus it is possible for example to specifically reinforce also a part of a conventionally fabricated preform, for example by placing patches in a load path aligned fashion at positions which are particularly stressed.

Generally such a process, which cab also be referred to as a fiber patch preforming technology, enables the placement of short fiber pieces (patches) at the precise position by a special laying process. The required properties of the preform can be obtained through the orientation and the number of fiber pieces.

The laying device according to the invention enables an orientation of fiber pieces along complicated three-dimensionally curved surfaces.

In a preferred embodiment, the laying device is suitable within the scope of such a fiber patch preforming technology (FPP) to precisely position fiber pieces (patches) which are impregnated with a binder and are cut into predefined geometries according to a special layout. A laying die which is proposed for this purpose forms a part of a laying device and can be used in different geometrical variations, for example in the form of a square or in the faun of a roller etc.

The elastically deformable surface is preferably provided on an elastomeric body. Especially the flexible surface is preferably made from silicone, an elastomer, which is able to stand many load cycles and simultaneously has a separating function that is beneficial especially in the transfer of binder-impregnated fibers and also for the placement of the fibers.

The adaption of the surface by means of an elastomeric body is similar to the pad printing technique, although any similar use in a laying device is not known.

In a preferred use of the laying device within the scope of the manufacture of preforms, load path aligned preforms can be produced especially by the placement of spread, short-cut fiber pieces. A fiber cutting system for instance cuts specially prefabricated binder-impregnated fiber bands into short pieces and delivers the same to a vacuum band-conveyor where the fiber band pieces are separated and transferred to the laying device. The delivery of the fiber band pieces to a laying head of the laying device takes place smoothly via a combination of suction modules and blow-off modules.

In a preferred embodiment, the laying device is provided with an activation device for the binder material, for example with a heating device on the laying head which heats the fiber band piece during its transfer to the position where it is to be placed and thus activates the binder. The laying head presses the fiber band piece onto the predefined position and then moves away preferably by a blow-off pulse. Thereafter, the laying head returns to its initial position.

For producing even complicated three-dimensional architectures, it is provided for example that during the placement the fiber band piece is pressed onto a section of a forming surface for the preform.

A laying head of the laying device including the flexible surface or pressing surface is preferably fully automatically controlled in such a manner that it can be reciprocated between at least one or more pickup positions where the fiber pieces are picked up, for example individual ones of the aforementioned fiber band pieces, and the respective predetermined positions.

To precisely place the fiber band pieces at the intended position, it is further preferred that the fiber pieces are held against the flexible surface. This can be implemented preferably by pneumatic forces, especially by means of a suction and blow-off operation. Holding the fiber band pieces by means of pneumatic suction has the advantage that the fiber pieces in addition to the simplified pickup can rest flatly on the surface without distortions. Particularly in a case where the fiber band piece to be placed is in a flat, spread condition, the fiber band piece can be easily held by suction.

In a case where a positioning device, by which the flexible surface is moved for the placement operation, is additionally provided with means for rotating or pivoting the surface, fiber pieces can be placed in an easy way with mutually different fiber orientations thus enabling a placement operation with fiber orientations able to follow even more strongly curved predetermined paths.

Accordingly, in a preferred embodiment, the laying device is adapted for a fast and smooth pickup of fiber pieces such as fiber cuttings and their transfer to a defined placement position. During the transfer an activation device activates a binder material for fixing the fibers. A heater which is integrated for example in the contact surface heats the material and thus activates a binder present on the fiber cutting.

At its placement position, the fiber piece is pressed onto the surface of for example a preform where the flexible surface adjusts to the surface geometry.

Further, at the placement position, the fiber group that has been applied in this way is advantageously released by a blow-off pulse. This also contributes to cooling the binder material. The binder material is cooled at the placement position and becomes solid thus fixing the fibers. The fiber material remains at the placement position while the laying head returns to the pickup position to pick up the next fiber piece.

BRIEF DESCRIPTION OF THE DRAWINGS

Embodiments of the invention will be described in more detail by way of the attached drawings wherein it is shown by:

FIG. 6b is a schematic illustration of the principle of operation of the loosening device of FIG. 6a;

FIG. 16 is a detailed schematic perspective view of the laying device of FIG. 8.

DETAILED DESCRIPTION OF THE PREFERRED EMBODIMENTS

Figure 1:
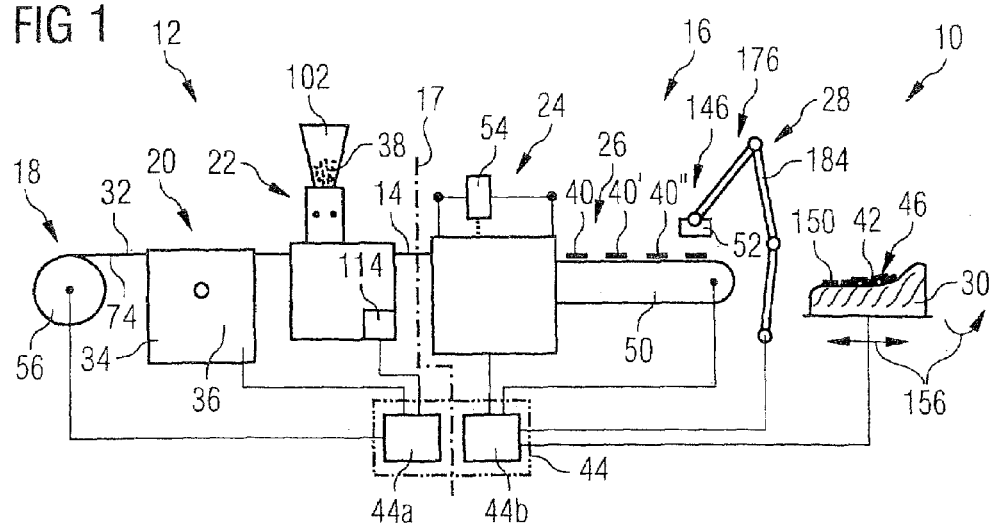
FIG. 1 is a schematic overview of a device for manufacturing a preform for producing load path aligned fiber composite structures.

FIG. 1 shows an overall representation of a preform manufacturing device generally designated by reference number 10. This preform manufacturing device allows the fabrication of a complicated textile semi-product with load path aligned fiber filaments for manufacturing fiber composite structures in an easy manner even if the semi-product has a complicated structure. Such textile semi-products are called preforms. The production of these preforms takes place in the device according to FIG. 1 from binder-fixed individual short fiber pieces that were previously cut off from a specially pretreated bundle of fiber filaments or fiber band. Accordingly, the preform manufacturing device can be divided up into a preparation module 12 for preparing the fiber band 14 and a cutting and laying module 16 for cutting off and placing fiber band pieces. The dash-and-dot line indicates a possible separation 15 between these modules 12 and 16.

Figure 8:
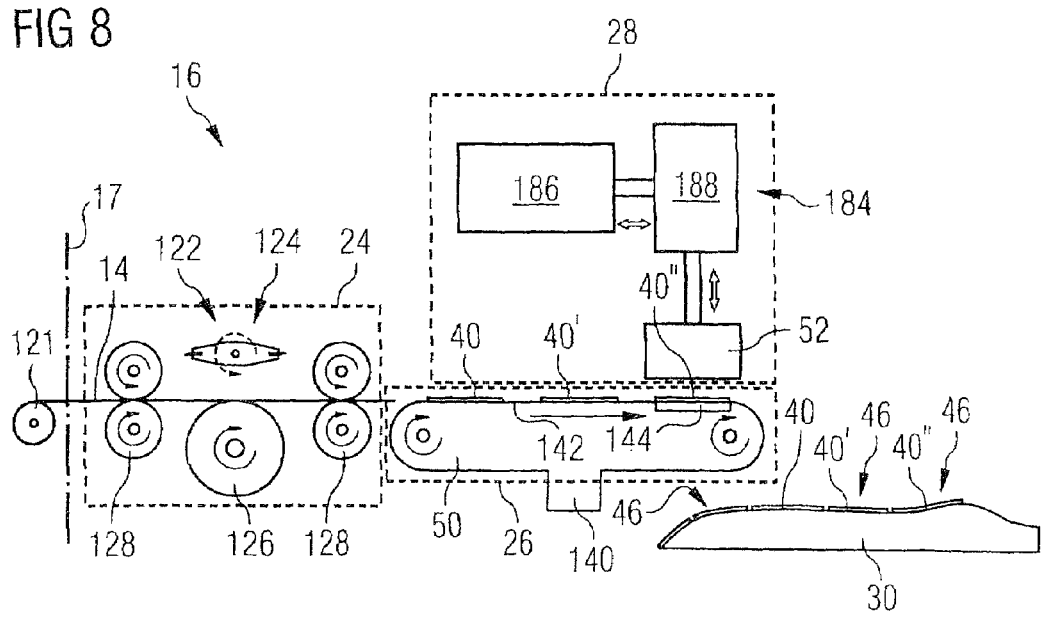
FIG. 8 is a schematic lateral view of a combination of a cutting and laying device employed in one embodiment of a device for manufacturing a preform.

FIG. 1 illustrates a first embodiment of such a cutting and laying module 16; a second embodiment of such a cutting and laying module 16 is illustrated in FIG. 8.

First of all the overall structure and the principle of operation of the preform manufacturing device 10 are explained with reference to FIG. 1. Thereafter the individual modules will be described with reference to the additional figures.

As can be seen from FIG. 1, the preform manufacturing device 10 includes a pay-off device 18, a spreading device 20, a binder impregnation device 22, a cutting device 24, a transfer device 26, a laying device 28 and a preform 30. These individual devices 18, 20, 22, 24, 26, 28 and 30 can each work independently and can also be used to serve their intended purpose without the respective other devices. The present disclosure hence comprises the respective devices 12, 16, 18, 20, 22, 24, 26, 28, 30 individually and alone.

The pay-off device 18 serves to supply a fiber filament strand, for example a roving 32. As described in more detail in the following, the pay-off device 18 is constructed in a manner such that the rovings 32 can be paid off without twisting. For manufacturing carbon fiber reinforced (CFC) components, a carbon roving is used in the illustrated embodiment.

The spreading device 20 serves to spread the individual filaments of the rovings 32 as widely as possible, to provide a fiber band 14 as flat as possible from a number as small as possible of layers of individual filaments placed side by side. For this purpose the spreading device 20 includes a spreading installation 34 and a loosening installation 36 as will be explained in more detail further down.

The binder impregnation device 22 serves to provide filaments of the fiber band 14 and/or individual fiber band pieces thereof with a binder material 38 serving to fix the fiber band pieces in the preform. In the embodiment illustrated in FIG. 1, the binder impregnation device 22 forms a part of the preparation module 12 and is thus used to provide the spread fiber band 14 with binder material 38. In embodiments of the preform manufacturing device 10 which are not further illustrated, a binder impregnation device 22 can be additionally or alternatively associated to the cutting and laying module 16 to then provide the fiber band pieces already cut off with binder material 38.

The cutting device 24 is constructed for cutting off pieces of a defined length from the fiber band 14 (fiber pieces). In the following the individual fiber band pieces are referred to as patches 40, 40', 40".

The transfer device 26 serves to separate the patches 40 and to transfer the same to the laying device 28.

The laying device 28 is constructed in such a way that it can pick up individual patches 40 and place them at predefined positions, in the present case on the preform 30. The preform 30 serves to give a predetermined three-dimensional surface design to the preform 42.

The preform manufacturing device 10 further includes a control device 44 comprising several controls 44a, 44b. The control device 44 controls the individual devices or installations 12, 18, 20, 22, 26, 30 in a manner such that the preform 42 is formed from the individual patches 40 in the manner of a patchwork quilt.

Accordingly, the preform manufacturing device 10 allows the following process of manufacturing a preform 42 for a load path aligned fiber composite structure being carried out automatically:

First of all a bundle of fiber filaments present in the form of a roving 32 is spread and provided with the binder material 38 which in the present embodiment can be thermally activated. The binder-impregnated fiber band 14 thus prepared is thereafter cut into pieces of a defined length—patches 40. The patches 40 are separated and transferred to the laying device 28. The laying device 28 places each patch 40 at a respectively predefined position 46 on the preform 30, and presses the patch 40 onto the preform 30.

Accordingly, with this preform manufacturing device 10 a fiber patch preforming technology can be implemented which allows the exact positioning of short fiber pieces through a special laying process. The required properties of the preform 42 can be achieved through the orientation and the number of fiber pieces. It is thus possible to orient fibers along defined curved paths and the fiber content can locally vary.

By the placement of spread, short-cut fiber band pieces—patches 40—optimally load path aligned preforms 42 can be fabricated. A fiber cutting device 48 cuts the specially prefabricated binder-impregnated fiber bands 14 into short pieces and delivers the same to a vacuum band-conveyor 50 of the transfer device 26.

The delivery of the patches 40 from the vacuum band-conveyor 50 to a laying head 52 of the laying device 28 takes place smoothly through a combination of suction and blow-off modules. The laying head 52 heats the patch 40 during the transfer to its placement position and thus activates the binder material 38. The laying head 52 presses the patch 40 onto the predefined position and then moves away by a blow-off pulse. Thereafter the laying head 52 returns to the initial position.

This technology allows the fully automatic production of complex fiber preforms. Parameters like fiber content, fiber orientation and curve radii can be largely varied.

In the embodiments illustrated herein, spread carbon fibers are used instead of textile semi-products for fabricating the preforms 42. The length of the fibers is very short (only a few centimeters) compared to pre-fabricated layings using long fibers. By a specific positioning of the short fibers—in the patches 40—high mechanical characteristics can be achieved which are similar to those of long fiber composites.

The short fibers can be relatively precisely placed along complex load paths. Textile cuttings as previously used for manufacturing such preforms merely allow preferential orientations being set. Thus with the technology herein described extreme geometric shapes can be produced. The manufacturing process is fully automated, and thickness variations within a preform and/or modified fiber volume contents can be achieved.

In the embodiment of the preform manufacturing device 10 illustrated in FIG. 1, a laser 54 is used as a fiber cutting tool 48 in the cutting and laying module 16. The laser is process-controlled and is precisely movable with respect to the fiber band 14. Further in FIG. 1, a robot arm is indicated as a mechanical laying system 184 for moving the laying head. The preform 30 can be precisely moved and rotated in a defined fashion relative thereto, in order to produce complex 3D structures of preforms 42 in a simple way.

In summary, a principle of the embodiment of the fiber patch preforming technology herein described is based on spreading carbon fiber rovings 32 as widely as possible, coating them with binder powder and cutting them into pieces of a defined length, so-called patches 40, by employing a novel cutting technique. These patches 40 are then picked up by a special laying device 28, placed at a predefined position and fixed by means of the binder material 38. In this way the most varying component geometries and fiber architectures can be produced.

In the illustrated fabrication process spread fibers are used. Fiber spreading forms a basis for avoiding local accumulations of fiber ends within the later composite material, since the same cause stress concentrations which in the worst case may result in a failure of the component. Spreading reduces the thickness of the rovings 32. Thus more continuous fibers can reach the zone of influence of a fiber end and compensate peaks of stress. Further, when the fibers are placed in an overlapping fashion, the step or shoulder on the cutting end of a roving 32 is reduced. In a non-spread roving such a step or shoulder could be as high as 250 μm and could cause a deflection of the carbon fiber situated on top of it from the load path direction. Additionally, a zone rich in resin could be formed there, negatively affecting the strength of the material.

To carry out the spreading operation as effectively as possible, twisting of the roving 32 shall be avoided, since filaments running transversely could again constrict a spread roving. The tension within the roving 32 in its spread state should be constant, since the spreading width and the spreading quality could be influenced by tension differences.

Figure 2:
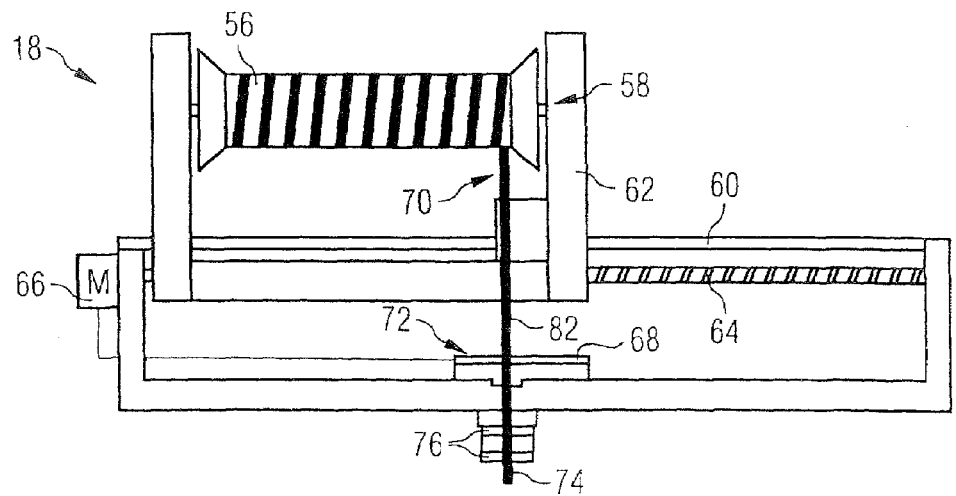
FIG. 2 is a schematic view of a pay-off device employed in a device according to FIG. 1 for paying off a bundle of fiber filaments processed in the device according to FIG. 1.

The pay-off device 18, which is described in more detail in the following with reference to FIG. 2, serves to enable delivery of a roving 32 in a non-twisted state from a supply reel 56 and to compensate the oscillating movement of the roving 32 during its withdrawal from the supply reel 56. For this purpose the pay-off device 18 comprises a movable support 58 of the supply reel 56 which is so designed that the supply reel 56 will correspondingly join up the position of the part of the roving 32 just being paid off, so that the pay-off position remains as constant as possible.

For this purpose, the support 58 comprises a carriage 62 supported along a linear guideway 60. The carriage 62 is movable by means of stepping motors and, in the illustrated embodiment, by means of a drive screw 64 in the direction of the rotation axis of the supply reel 56. The carriage 62 is driven by a motor 66 with an integrated control. A sensor 68 monitors the current position 70 of the roving 32 and thus controls the rotation of the motor 66.

Figure 3:
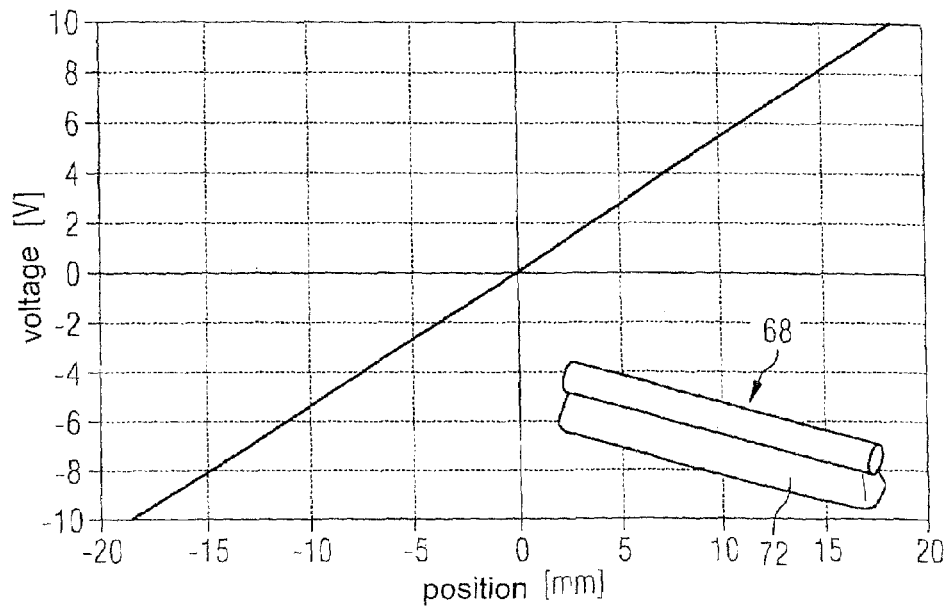
FIG. 3 is a schematic perspective view of a position sensor for use in a pay-off device of FIG. 2 and its characteristic curve.

A photodiode 72 which is illustrated in FIG. 3 together with its characteristic curve serves as a sensor 68. A diode line of the photodiode 72 registers the shadow of the roving 32 and outputs the position via an amplifying circuit (not further shown) as an analog signal. The center of a shadow corresponds to a particular voltage as a function of the position. The analog signal is transmitted as a bipolar tension signal to the control of the motor 66, with 0 Volt corresponding to the center of the sensor. Additionally, the sensor 68 is exposed to a flash from an IR-LED spotlight at a particular frequency, for example 10 KHz, to prevent the measuring signal from being influenced by ambient light. This sensor 68 is optimized for the special requirements of a pay-off operation compensating the position of the roving 32 on the supply reel 56 and also allows still further adjustments such as the displacement of the center and the adjustment of the bending. The combination of a spatial resolution photodiode 72 and a controlled servo motor 66 has the advantage that the counter movement is caused in dependence of the current speed of movement of the roving 32. Relatively low-speed compensation movements are caused at low pay-off speeds, whereas high pay-off speeds cause correspondingly fast counter movements. This enables the roving 32 being unreeled mainly oscillation-free as a flat band or tape 74. On the end of the pay-off device 18 the roving 32 passes in an S-like movement around two little reels 75—in the present case two waisted stainless steel reels which additionally calm final oscillations. Differently from the way illustrated in FIG. 1, the pay-off device 18 can also be operated completely autonomously, i.e. independently of the remaining modules and normally only requires power supply, e.g. an electrical connection.

After the pay-off device 18 the roving 32 passes a spreading line in the spreading device 20.

As already mentioned above, the spreading device 20 comprises the spreading installation 34 which is shown in more detail in FIG. 5 and the function principle thereof is described with reference to FIG. 4.

Figure 4:
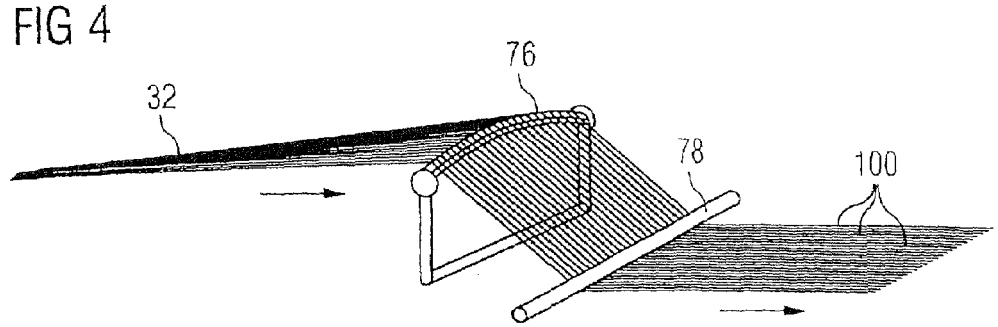
FIG. 4 is a perspective view of a spreading device for explaining the principle of operation of the spreading of a bundle of fiber filaments applied in a device according to FIG. 1.

FIG. 4 shows the basic layout of a conventional spreading principle already known from DE 715801 A. Here a fiber strand 14 successively passes a bent rod 76 and thereafter a straight rod 78. In the conventionally known radius spreaders illustrated in FIG. 4, the combination of a straight rod and a bent rod provides for a pulling force which acts on the fiber being redirected. Now also a force acts through which the fiber is pressed onto the bent rod. At the highest point of deflection the filaments are subject to the highest force. This force decreases with an increasing distance from this point. This means that the filaments can evade the load if they move outwardly on the bent rod. But the result of the spreading operation depends on the pulling force acting on the fiber, the friction between fiber and rod, the position of the rods relative to each other and the curvature of the rod. If the curvature is extreme, the difference of the forces acting between the highest point and an outward position is so big that the surface friction of the rod does no longer play a part. The filaments would abruptly move outwardly, i.e. the roving 32 would slip off or split. If the curvature is insufficient, the spreading ratio would be too small.

For this reason, the radius spreader illustrated in FIG. 4 is not suitable for the industrial processing of rovings 32 to prepare the same for the preform fabrication on an industrial scale. In particular, defects in the roving 32 such as twisting, gaps or folds would cause the spread material to slip off or split.

Figure 5:
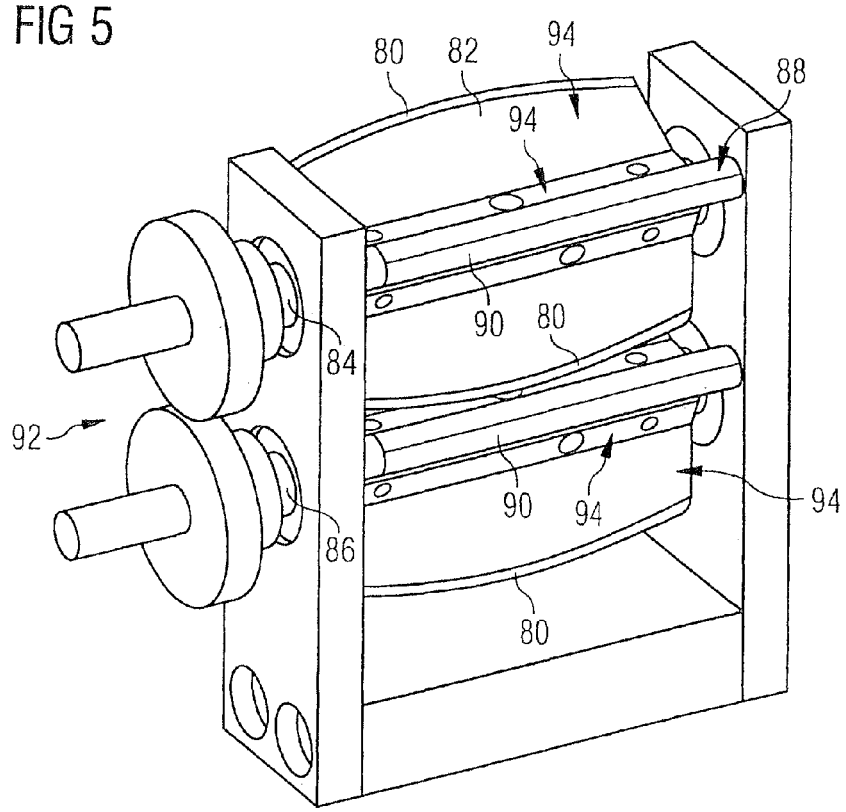
FIG. 5 is a schematic perspective view of a spreading device for use in a device according to FIG. 1.
Figure 6A:
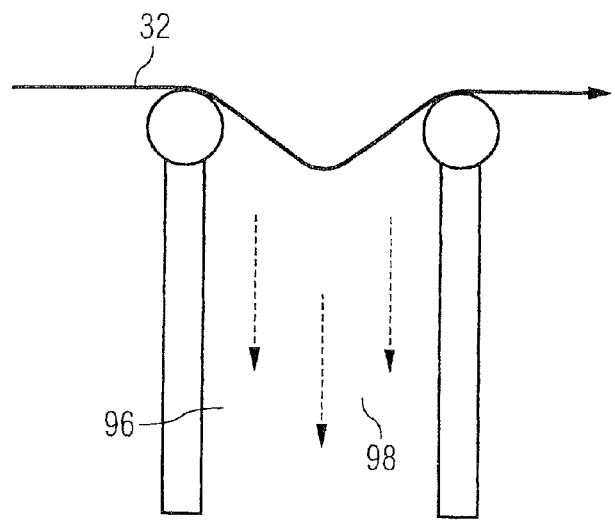
FIG. 6a is a schematic lateral view of a loosening device for use in a device according to FIG. 1.
Figure 6B:
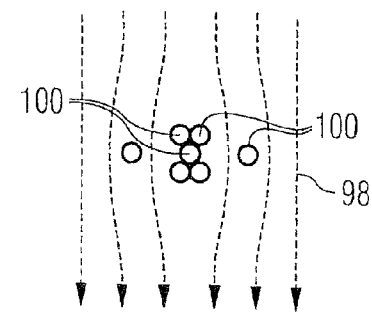

With the spreading installation 34 illustrated in FIG. 5 the problems concerning the quality of the material of rovings or of other fiber filament bundle intended to be spread, in that the roving 32 or the fiber filament bundle is newly placed again and again onto at least one convexly bent spreading edge. For this purpose the spreading installation 34 includes at least one convexly curved spreading edge 80 which moves relative to the roving 32 or any other bundle of fiber filaments by at least one component direction perpendicular to the longitudinal extension of the roving 32 or any other bundle of fiber filaments, so that the same is placed under tension onto the convexly curved spreading edge 80 and thereafter moves away vertically from the roving 32 or the bundle of fiber filaments by at least one direction component, so that the bundle of fiber filaments becomes detached from the spreading edge 80.

In its practical configuration the at least one spreading edge 80 is formed on a radial projection 82 on a rotary shaft 84.

In the preferred construction according to the embodiment illustrated in FIG. 5, at least two edges, at least one of which being constructed as a convexly curved spreading edge 80, is movable from opposite directions towards the roving 32 or the bundle of fiber filaments. For this purpose this embodiment provides two rotary shafts 84, 86 having radial projections 82. The rotary shafts 84, 86 rotate in mutually opposite directions.

In addition to first radial projections 82, where the convexly curved spreading edges 80 are formed, a preferred embodiment also provides second radial projections 88 terminating in straight edges 90. A spreading device is thus provided in which at least one convexly curved spreading edge 80 and at least one straight spreading edge 90 can move from opposite directions towards the roving 32 or the bundle of fiber filaments until the roving 32 or the bundle of fiber filaments is spread between the edges 80, 90 in the manner similar to that illustrated in FIG. 4. The edges 80, 90 can also be returned in the opposite direction to relieve the roving 32 or the bundle of fiber filaments.

In the embodiment according to FIG. 5, this is particularly easily implemented in that several wings 94 forming the radial projections 82, 88 are formed on the rotary shafts 84, 86 driven in the opposite directions by means of a gear mechanism 92. The wings 94 substantially extend in the axial direction and the edges 80 or 90 are formed on their radially outermost regions. A wing 94 comprising the straight edge 90 is followed in the circumferential direction by a wing comprising a convex radially outwardly curved spreading edge 80, and this wing is in turn followed by a wing 94 comprising a straight edge 90 and so on.

In a different embodiment, the edges of all wings 94 are constructed as radially outwardly curved spreading edges 80. By the arrangement on moving elements that move in the opposite directions, in the present embodiment the two rotary shafts 84, 86, the fibers are each spread between two oppositely curved spreading edges 80.

In this way the spreading installation 34 is constructed as a so-called wing-type spreader which provides for a repeated placement of the rovings 32 on the spreading edges 80. Additionally, a finishing layer on the roving 32 or on the bundle of fiber filaments is broken open by the alternating bending operation, and the filaments 100 can move independently from each other.

The spreading installation 34 in the spreading device 20 constructed as a wing-type spreader is followed in the conveying direction of the rovings 32 by a loosening installation 36 which in the present embodiment is constructed as a suction chamber according to the so-called Fukui principle. The suction chamber 96 can be of a type which is described in U.S. Pat. No. 6,032,342. The loosened and pre-spread roving 32 is drawn into the suction chamber 96 by a strong laminar air stream 98. Air is caused to flow around the individual filaments 100 so that the filaments can relatively easily slide one above the other. Further the suction chamber 96 is able to compensate minor fluctuations in the tension of the rovings 32.

At the production of plastic fibers the bundles of filaments are frequently freely guided and passed through eyelets. During this operation, parts of the filaments 100 can twist around the remainder of the bundle and cause constrictions of the rovings already at the time of manufacture. After the reeling of the bundle of filaments on a roving reel these defects are hardly visible, because the bundle of filaments is reeled up in a flat condition. But after the bundles of filaments have been loosened in the spreading installation 34 roving parts running in the transverse direction can be clearly seen. This effect can cause gaps and displacements within the roving 32 which negatively influence the spreading quality.

To achieve a spreading pattern which is as homogeneous as possible, an embodiment of the invention which is not explicitly shown provides for a multistep spreading operation, in which the spreading ratio is stepwise increased. For this purpose a first spreading installation 34 and a first loosening installation 36 for spreading the roving 32 to a first width, for example a value between 8 and 16 mm, are provided. This is followed by a next step comprising a further spreading installation 34 having a larger width and a further loosening installation 36 having greater dimensions than the first spreading installation and the first loosening installation, in order to effect spreading to a larger width, for example to a value between 20 and 35 mm.

Thereafter, the roving 32 is present in form of a wide, thin band, i.e. the fiber band 14.

In the further process, this fiber band 14 is still provided with a small amount of the binder material 38.

Theoretically, only three filaments are placed one on top of the other in a 12 k roving which is 30 mm wide and perfectly spread. In this case a diameter of the filaments 100 of 7 μm and the highest packing density have been assumed. But in reality a roving 32 still includes spreading defects that may locally cause thicker areas and thus a higher number of filament ends.

Figure 7:
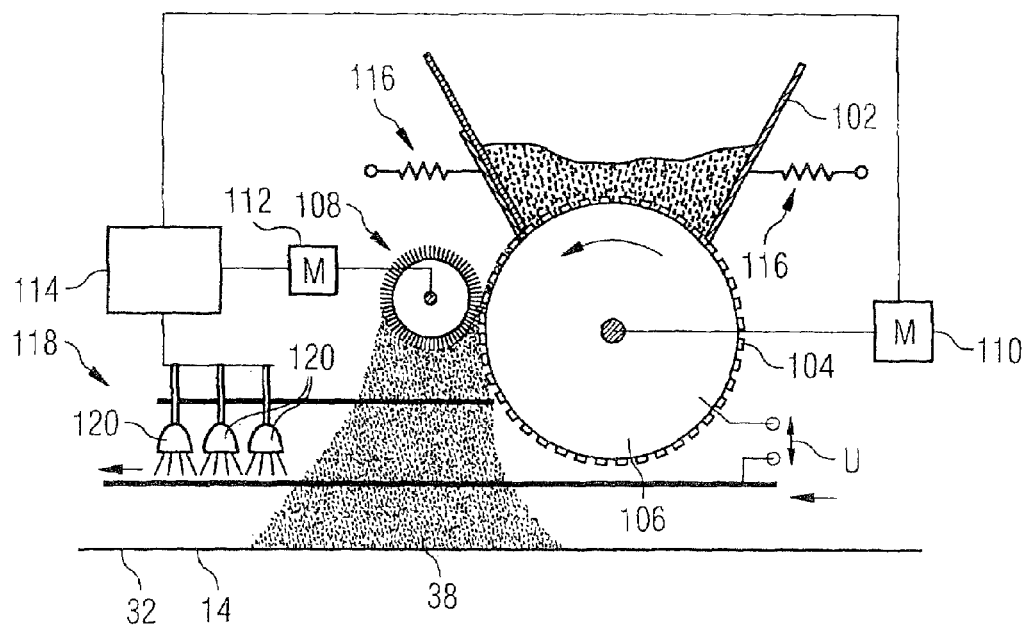
FIG. 7 is a schematic lateral view of a binder impregnation device for use in a device according to a first aspect of the invention.

The impregnation of the thus spread rovings 32 with binder material 38 takes places in the binder impregnation device 22, the principle thereof is illustrated in FIG. 7. The basic principle of the binder impregnation device 22 is similar to that of a powder shaker of a kind described for example in U.S. Pat. No. 3,518,810, U.S. Pat. No. 2,489,846, U.S. Pat. No. 2,394,657, U.S. Pat. No. 2,057,538 or U.S. Pat. No. 2,613,633. Accordingly, this powder shaker comprises a funnel 102 with a roller 106 having radial raised portions 104 moving past the exit of the funnel.

In the illustrated embodiment said roller 106 is a knurled steel roller which is transports the powder with its rough surface. This roller 106 is in turn treated by a brushing roller 108 removing the powdery binder material 38 from the roller 106 and sprinkling the same onto the fiber band 14 moving past under the roller 106.

Between the fiber band 14 and the application mechanism a voltage U can be applied, so that the powder will electrostatically adhere to the fiber band 14 like in a powder coating process.

The transfer roller 106 and the brushing roller 108 are driven by two separate electric motors 110 and 112 to enable free adjustment of the sprinkling parameters. Control takes place through a control unit 114 which can be a part of the control device 44.

To avoid the powder from becoming blocked thus causing jamming of machine parts, the funnel 102 is not rigidly fixed to the remainder of the binder impregnation device 22, but is supported on a holder 116 which allows compensating movements. An advantage of the holder 116 is that the funnel 102 can oscillate during operation thus automatically shaking the powder downwards. The powder is sprinkled in an amount which can be exactly dosed onto the surface of the roving 32 which moves past under the funnel at a defined speed of 3 to 6 m/min for example. Excessive powder falls into a collection container (not shown) outside of the roving 32 and can be recycled to the process at a later time.

Measurements have shown that the amount of binder material applied by sprinkling is almost a linear function of the rotating speed of the roller 106.

The binder impregnation device 22 also includes a heating installation 118 serving to fix the powder particles of the binder material 38 melting at heating temperatures to the surface of the filaments 100.

In the illustrated embodiment the heating installation 118 comprises a heating line which is about 100 to 500 mm long. The preferred embodiment of the heating installation 118 is equipped with radiant heaters, in the present case infrared radiant heaters 120. The heating power of the heating installation 118 can be precisely set through the control unit 114.

The binder particles are slightly melted and adhere to the fiber surface.

Figure 1A:
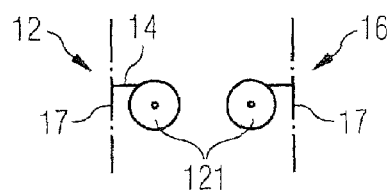
FIG. 1a is a schematic view of an alternative embodiment of the device of FIG. 1 at a separation plane indicated by a chain line.

Thereafter—as illustrated in FIG. 1*a*—the finished fiber band 14 can be reeled up on a special film reel 121 and stored for later use.

In the embodiment illustrated in FIG. 1, the fiber band 14 specially prefabricated in this way is supplied to the cutting installation where it is cut into the patches 40, 40', 40" and thereafter laid by the laying device 28.

FIG. 1*a* shows an embodiment with separate modules 12, 16 and the use of film reels 121 as an example for intermediate storage. The modules 12, 16 in this form could also be situated in different production sites.

FIG. 8 illustrates in more detail a second embodiment of the cutting and laying module 16. In the embodiment according to FIG. 8 the cutting device 24 comprises a fiber cutting tool 122 having a knife system 124 and a counter roller 126 and at least one or, as in the present case, several transport rollers 128.

The knife system 124 can be operated in dependence of the rotating speed of the counter roller 126 and/or the transport rollers 128, for cutting patches 40 of a defined length.

In particular, the knife system 124 includes a coupling mechanism (not further illustrated) coupling a drive unit of the knife system 124 with the drive unit of the rollers 126, 128.

In the illustrated example the knife system 124 is provided with a cutting cylinder 130 which, as a radial projection, includes at least one and in the present case several cutting edges 132. In the illustrated embodiment the cutting cylinder 130 can be coupled by a coupling means not further shown to the drive unit of the counter roll 126 in such a manner that the cutting edges 132 move with the same peripheral speed as the surface of the counter roller 126.

Figure 9:
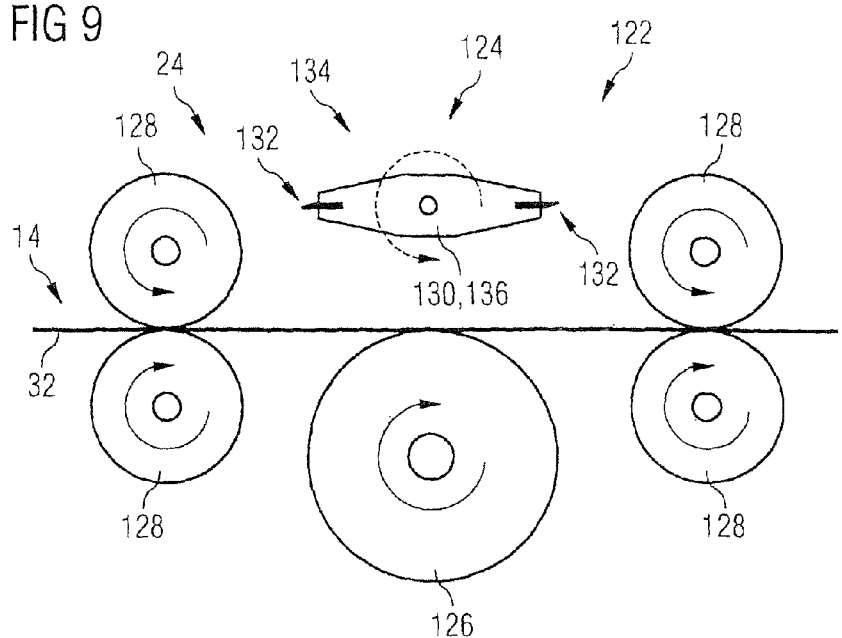
FIGS. 9 and 10 are schematic illustrations of the principle of operation of the cutting device of FIG. 8.

The cutting device shown in FIG. 8 and in more detail in FIG. 9 accordingly comprises a coupled cutting system 134 in which two pairs of transport rollers 128 and a rubberized counter roller 126 are driven by means of a motor not further shown via a central form-locking transmission, for example a toothed belt (not shown). The transport rollers feed an endless fiber band—in the present case particularly the spread fiber band 14—and direct the same over the counter roller 126 rotating at the same speed.

Above the counter roller 126 a cutter bar 136 is in the waiting position.

If a cut is to be made, an electromagnetic clutch couples the cutter bar 136 into the movement of the cutting system. At the contact point the cutter bar 136 and the counter roller 126 have the same rotating speed. The material to be cut is broken by a knife blade 138. Thereafter the cutter bar 136 is decoupled and stopped for example by means of an electromagnetic brake (not shown). The second pair of transport rollers 128 removes the cuttings.

The coupled cutting system 134 enables the cutting of spread fiber bands without distortion. The cutting act or the cutting length can be adjusted computer-controlled during operation.

The brake system (not explicitly shown) provides for a permanent locking of the cutting cylinder 130 when the clutch is not active. The coupling and braking operations take place via a common changeover relay (not shown) thus excluding failure caused by program errors. A sensor system (not further shown), for example an inductive proximity switch, registers the position of the knife and provides for a braking effect on the knives in a horizontal position. If the connected control unit, for example the control unit 44, outputs a cutting command, the cutting cylinder 130 is coupled, accelerates and makes a cut. If at this time the cutting cylinder 130 has the same peripheral speed as the counter roller 126, as provided in this embodiment, the knife blade 138 is not bent or deformed resulting in an endurance of the knife which is much higher than that of a simple vertical knife. After the cutting operation the cutting cylinder 130 is decoupled and decelerated and held at the same position as at the beginning. The cutting length is programmed in control software.

Figure 10:
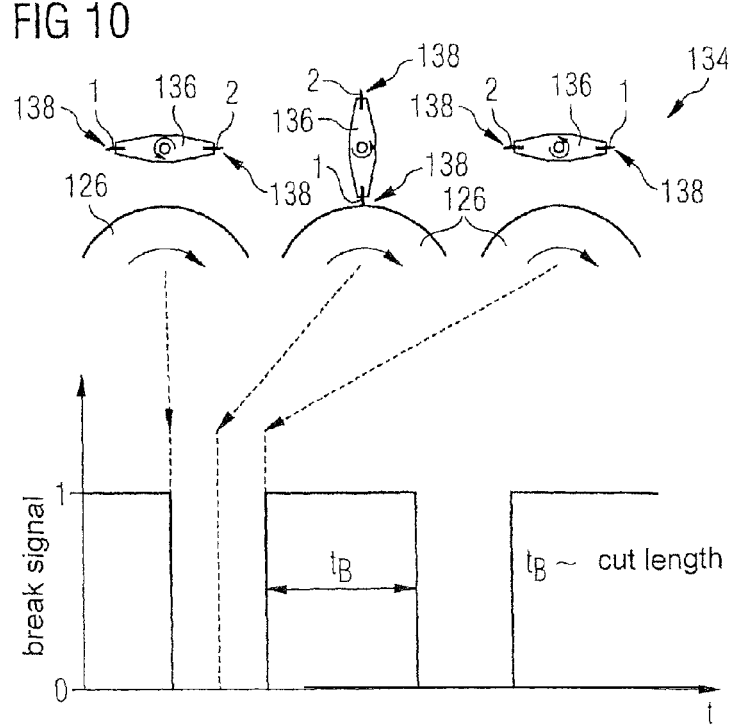

FIG. 10 schematically illustrates the flow of the cutting system control. As shown in FIG. 10, the cutting cycle is predetermined in dependence of the feeding speed of the cutting system. The minimum cutting length results from the dimension of the cutting cylinder 130 and the counter roller 126 and is within a range for example of the width of the spread fiber band 14. The maximum cutting length is theoretically unlimited.

In both illustrated embodiments of the cutting and laying module 16, after leaving the cutting device 24, the patches 40, 40', 40" are transferred to the transfer device 26 which removes the patches 40, 40', 40" from the cutting device 24 at a transporting speed which is higher than the conveying speed of the fiber band 14 to the or in the cutting device 24. Thus the patches 40, 40', 40" are separated and sufficiently spaced from each other. The transfer device 26 comprises a holding system to hold the patches 40, 40', 40" fast to the transfer device and a delivery system to deliver the patches 40, 40', 40" to the laying head 52 of the laying device 28.

The holding system and the delivery system are here implemented in the form of a vacuum band-conveyor 50. A large-volume suction chamber 140 distributes the suction force of a vacuum source not further shown, for instance a suction blower, over the entire transfer device 26. A band comprising many through pores, for example a polypropylene band, is passed over a perforated metal sheet 142 covering the suction chamber 140.

The transfer device 26 is driven through its coupling to a conveyor unit of the cutting device 24. In the illustrated embodiment, the vacuum band-conveyor 50 is coupled to the form-locking transmission driving the transport rollers 128 and the counter roller 126. A corresponding transmission ratio, e.g. a transmission ratio of 1:2, provides for a sufficiently large distance between the patches 40, 40', 40". At the end of the transferring distance a suction-type blow-off chamber 144 is situated and driven by a pneumatic vacuum module. The suction-type blow-off chamber is in operation as long as a fiber piece—patch 40—is passed over the suction-type blow-off chamber 144. As soon as the laying die is at a predetermined delivery position 146, a blow-off pulse is output at the right moment to deliver the patch 40 to the laying head 52.

The laying head 52 attracts the patch 40 by suction, heats and transfers it with a predetermined orientation to its predetermined position.

Figure 11:
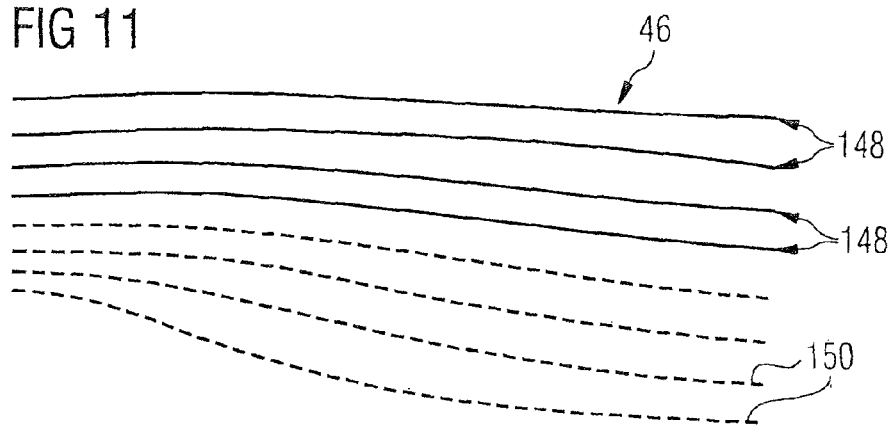
FIG. 11 is a schematic view of predetermined paths for the placement of fibers by one of the devices according to FIG. 1 or FIG. 8.

As illustrated in FIG. 11, during this operation the patches 40, 40', 40" are placed onto the preform 30 along predetermined curved paths 148. Pos. 150 indicates patches laid with a corresponding orientation along these curved paths 148 and their overlapping. In the overlapping zones the patches 40 are fixed to each other by the binder material 38 heated by the laying head 52.

Figure 12:
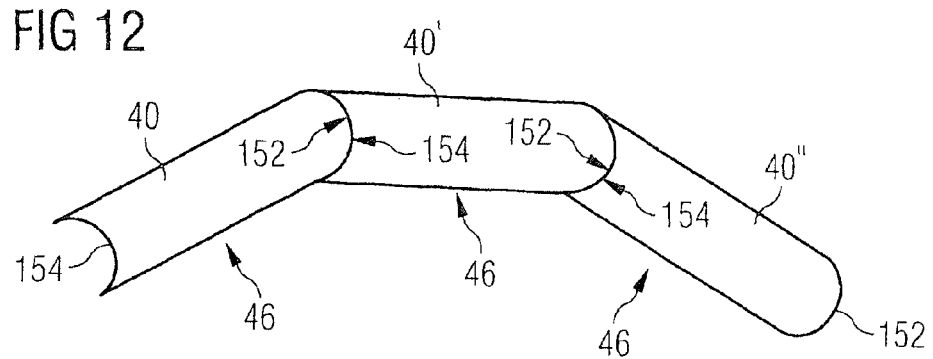
FIG. 12 is a series of fiber band pieces placed by the device according to FIG. 1.

The cutting device shown in FIG. 1, in conjunction with a laser 54 (or any other kind of beam cutting technique) even allows the production of complicated shapes of cutting edges. FIG. 12 illustrates a particularly preferred shape of cutting edges, with the cutting edges 152, 154 being curved in a complementary fashion convexly or concavely with respect to each other. The oppositely directed cutting edges 152, 154 on each patch are curved in a circular arc fashion. Thus the cutting edges 152, 154 of patches 40, 40', 40" that are arranged one behind the other can be placed very close to each other without producing gaps or thickenings even if the patches 40, 40', 40" are angled. In this way a lay-up is possible with the fiber pieces constantly tightly abutting and having a corresponding fiber orientation also along small curvature radii of the paths 148. The fixing of the patches 40, 40', 40" can be effected by overlapping with adjacent patches or those arranged above or underneath (not shown).

Figure 13:
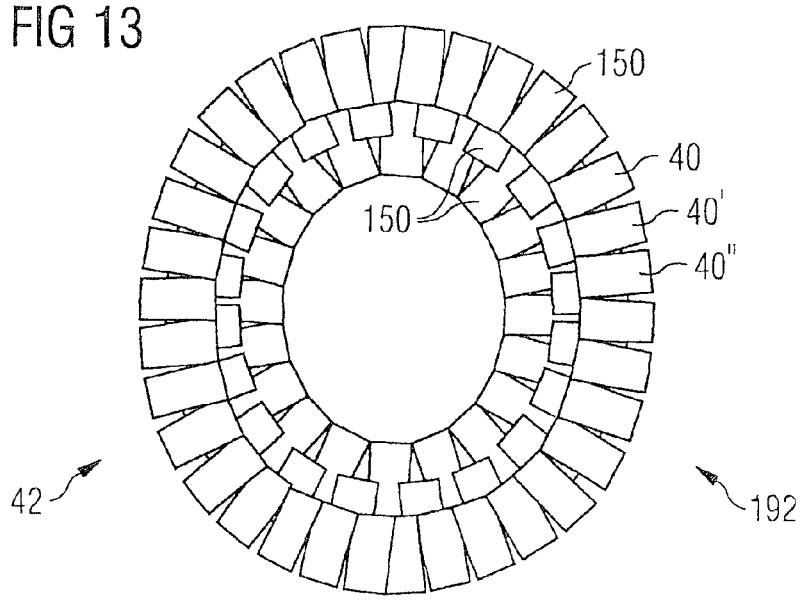
FIG. 13 is a schematic view of a preform to be manufactured in a device according to FIG. 1 or FIG. 8.

In this manner it is possible to produce even very complicated preforms 42 like those indicated for example in FIG. 13. In this example, short fiber pieces according to the patchwork type make up a preform 192 for a load path aligned fiber composite structure for a window funnel of an aircraft or spacecraft for example. The patches 40, 40', 40" are oriented corresponding to the load paths.

Concerning the technical process, the illustrated annular shape can be achieved by defined rotatable preform 30 as indicated by the arrows 156 in FIG. 1.

Now, the laying device 28 and its laying head 52 of the embodiment of the cutting and laying module 16 illustrated in more detail in FIG. 8 will be further explained with reference to the FIGS. 14 to 16.

The laying head 52 has the function to pick up a fiber piece or patch 40, 40', 40" and to transfer the same to the respective next predetermined position 46 on the preform 30 requiring lay-up of a patch 40, 40', 40". For this purpose the laying head 52 includes a holding device. While other holding devices are also conceivable, the holding device in the illustrated example is constituted by a suction device 158 which makes picking up the patches from the transfer device 26 easier.

Further, it is advantageous to activate the binder material 38 with which the picked-up patch 40 is provided, during the transfer by means of the laying head 52. For this purpose the laying head 52 includes an activation system for activating the binder material 38. The configuration of the activation system depends on the binder material which is used. For example, if a binder material is used which is activated by an additive, the laying head comprises means for adding the additive. In a different embodiment not further illustrated, an instantly activated binder material such as an adhesive is supplied only during the transfer of the patch on the laying head. In this case the laying head includes means for the addition of binder material. For use in the above-described preform manufacturing device employing a thermally activated binder material 38, the activation system is constructed as a heating device 160 in the illustrated embodiment.

It is further preferable for the laying head 152 being able to lay-up the patch 40, 40', 40" even against complicated three-dimensional surface architectures of the perform 30. To this end, the laying head 52 includes a pressing device 162 suitable for pressing the transferred patches 40 against different surface architectures. The pressing device 162 includes in a preferred construction a flexible surface 164 where the patch 40 can be held by means of a holding device. Further preferably, the flexible surface 164 is formed on an elastic carrier 166.

Figure 14:
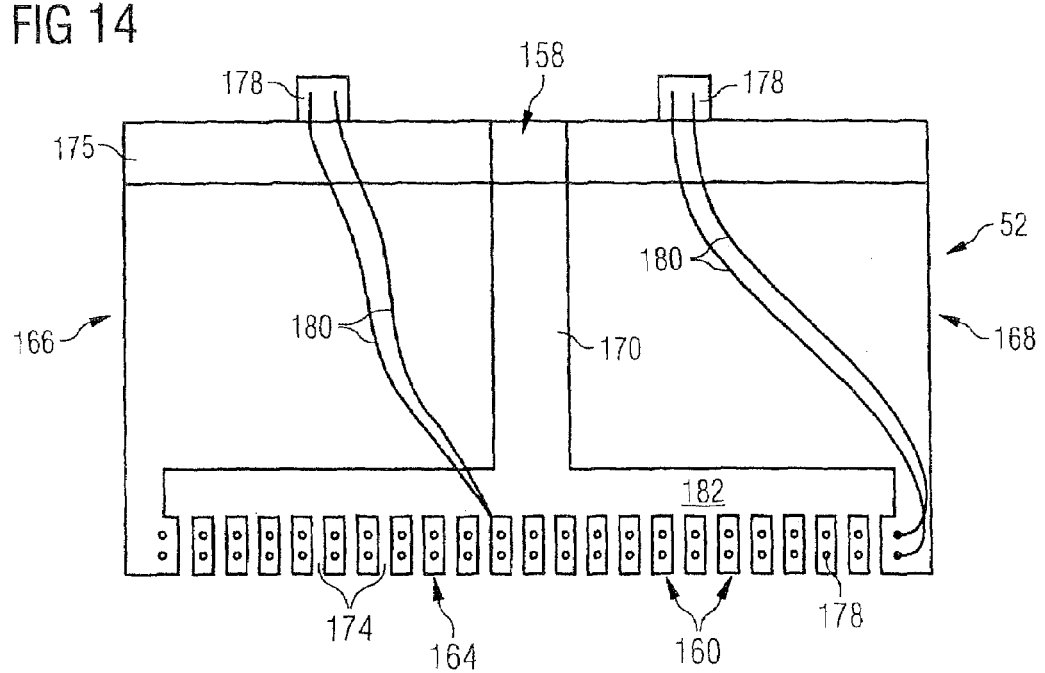
FIG. 14 is a schematic cross sectional view of a laying head for use in a laying device according to FIG. 1 or FIG. 8.

FIG. 14 shows a cross sectional view of a laying die 168 of the laying head 52 combining the holding device, the activation system and the pressing device. The laying die 168 shown in FIG. 14 accordingly comprises the suction device 158, the heating device 160 and the pressing device 162 with the flexible surface 164 on the elastic carrier 166.

Figure 15:
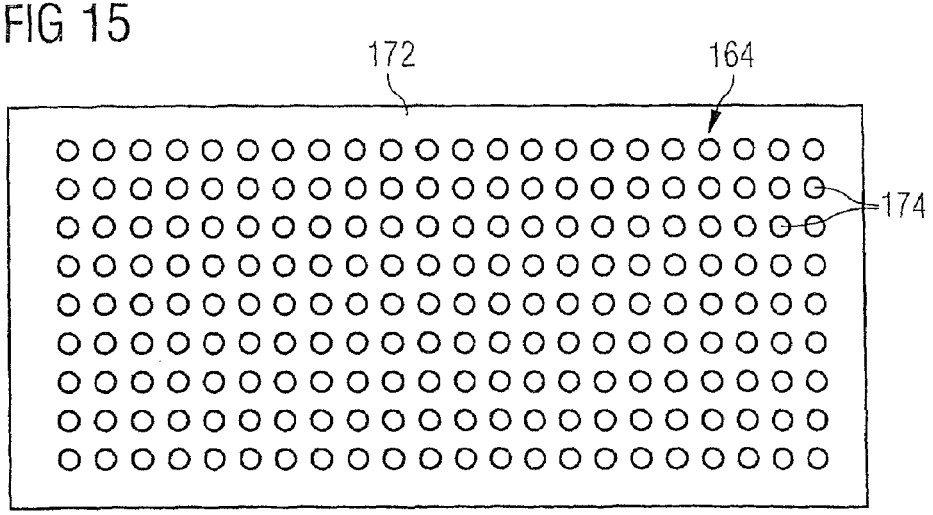
FIG. 15 is a bottom view of the laying head of FIG. 14.

FIG. 15 is a bottom view of the flexible surface 164.

If the fiber patch preforming technology (FPP) is applied, the laying die 168 enables fiber pieces (patches) which are binder-impregnated and cut into defined geometries being precisely placed at the intended position according to a laying pattern (for example the laying pattern shown in FIG. 11). The laying die 168 is a central component of the laying technology and can be used also in other geometrical variations. For example, square or roller-shaped laying dies are also conceivable.

In the concrete embodiment according to FIG. 14, the laying die 168 is configured as a silicone die. The surface adaption of the silicone die is similar to pad printing, although the present field of application is completely different.

The laying head 168 can quickly and gently pick up and transfer fiber cuttings to the defined location through an integrated suction—suction device 158. During the transfer, a heater—heating device 160—integrated in the contact surface—flexible surface 164—heats up the material and thus activates the binder—binder material 38—on the fiber cutting. The fiber cutting is pressed onto the surface, with the soft die material adjusting to the surface geometry. When the laying die 168 moves away from the surface, a blow-off pulse is output, the binder material 38 is cooled and the fiber material remains where it has been placed.

The laying die 168 enables the production of fiber patch preforms 42.

In FIG. 14, the elastic carrier 166—elastic pressing body—is represented including an air distribution 170 which forms a part of the suction device 158. The part of the suction device 158 which is not illustrated is provided with the usual pneumatic sources and pneumatic controls (not shown). Further, the flexible surface 164 is represented as an elastic heating surface 172 including suction and blow-off channels 174.

The elastic carrier 166 is seated on a coupling plate 4 which is provided with removable fixing elements (not shown) for fixing the laying head 168 to a positioning device 176 (see FIG. 16).

Further, a thermo element 178 is provided as a control element of the heating device 160. A highly flexible electrical power line 180 connects the thermo element 178 to the elastic heating surface 172.

FIG. 15 shows a suction surface—flexible surface 164—including the suction and blow-off channels 174.

The use of the laying die 168 as well as further details of the laying device 28 will be described in the following in context with its use in the preform manufacturing device 10.

In the fiber patch preforming technology individual fiber patches 40 are arranged to form a three-dimensional preform 42, 192. To achieve this, the layout plan is implemented by applying a suitable laying technique. The laying device 28 is delivered the binder-impregnated and cut fiber patches 40 from the vacuum band-conveyor 50 associated with the cutting device 24 and places the fiber patches 40 onto a surface, at a cycle which is a quick as possible. In the illustrated embodiment the fiber patches 40,40', 40" are placed onto a surface of the preform 30.

The patches 40, 40', 40" shall be pressed onto the forming surface to produce a robust preform 42. The laying die 168 shall be as soft as possible to adjust to a three-dimensional surface with uniform force. For this configuration it is further preferred that shortly before the placement of the patches a certain amount of heat can be provided for activating the binder material 38. For this purpose the flexible surface 164 includes the heating device 160 which influences the mechanical properties of the die material as less as possible. Similar to the vacuum band-conveyor 50, a two-dimensional fixing of the filigree fiber patches 40 is beneficial. For this purpose the flexible surface 164 also has a suction function.

The manufacture of the laying die 168 is similar to the manufacture of printing pads known from printing engineering. For the manufacture of printing pads a series of special silicones are available which are able to resist for a long time the permanent mechanical load cycles. Among these silicones this kind of silicone is selected which meets the additional requirements caused by the heating device 160 and the contact with the binder material 38 as perfectly as possible. For example the silicone type M 4615 available on the market from the company of Wacker is suitable because of its high tensile strength and its ability to be doped with softeners. Since the laying die 168 has incorporated a heater, tests have been made with regard to the temperature stability of the die material. In this case it is advantageous for the laying die 168 being able to resist permanent temperatures of up to 200° C. Conventional softeners based on silicone oil have a tendency to an increased diffusion and may leak from the silicone die. This problem can be solved by softeners by which the silicone has at least partly been wetted. Such a softener is available for example from the company of Wacker under the product name MH20.

For heating the lay-up surface of the laying die 168 various heating devices 160 can be used, among others also electric heating devices, fluid circuits or hot air. Concerning the fabrication technique, the variant comprising an electric heating device 160 is the most convenient to implement and simultaneously offers the possibility of a high heating power and an exact temperature setting.

To not influence the flexibility of the carrier 166, the electric power lines 180 are advantageously formed by means of carbon fiber yarn. The high flexibility of such a fiber yarn prevents the flexible surface 164 from becoming stiff. Also, such a fiber is able to stand several 100,000 load cycles.

The thermal conductivity of the elastic carrier 166 can be increased by admixing then sally conductive material to the silicone. Aluminum powder or a powder of any other light metal is suitable for this purpose.

With a powder moiety of about 10-25 percent by weight, particularly 20 percent by weight, the thermal conductivity of the flexible surface 164 is sufficiently high, so that a heating element of the heating device 160 and the flexible surface 164 can be kept at almost the same temperature.

On the other hand, a higher powder moiety might affect the flexibility of the laying die 168. If the powder moiety is still further increased, an electrical breakdown may be caused. For this reason, the stated moiety is the most preferred moiety.

The suction and blow-off channels 174 are integrated in the flexible surface 164 of the laying die 168 and join each other inside the laying die 168 through a chamber 182. In the chamber 168 an absorbing suction fleece (not shown) is inserted preventing collapsing when subject to the pressure load of the laying die 168.

To avoid electrostatic charging, the flexible surface 164 is advantageously made of a flexible material having antistatic properties. The flexible surface is formed for example from an antistatic silicone. Thus the elastic carrier 166 formed from the above-mentioned silicone exhibits good elastic properties while the flexible surface 164 is formed from an antistatic silicone. One example of such an antistatic silicone is that available on the market under the trade name Elastosil RT402.

The mechanical lay-up system of the laying device 28 will still be explained in the following with reference to FIG. 16.

The mechanical lay-up system 184 illustrated in FIG. 16 serves to move the laying die 168, in order to transfer fiber patches 40 from the cutting device 24 to the predefined position 46. The mechanical lay-up system 184 allows a rapid laying cycle and an adjustable lay-up angle.

As explained above, the patch 40 is delivered in contactless fashion from the vacuum band-conveyor 50 to the laying die 168. For this purpose the control device 44 outputs a blow-off pulse of the suction/blow-off chamber 144 of the vacuum band-conveyor 50 after a preset delay time and in dependence of the cutting command. The patch 40 is delivered via an air path of a few millimeters (about 0.5-10 mm) to the aspiring laying die 168. Thereafter, the movement cycle of the mechanical lay-up system 184 commences.

The mechanical lay-up system 184 comprises a translational drive for the transfer of the laying die 168 from the pick-up position to a position above the predetermined position. In the illustrated embodiment of the mechanical lay-up system 184 the first drive unit is constituted by a horizontal pneumatic cylinder 186. This horizontal pneumatic cylinder 186 is adapted to move the laying die 168 from its pick-up position to the placement position. A second drive unit constituted by a vertical pneumatic cylinder 188 presses the laying die 168 onto the surface, preferably at a pressure that can be adjusted.

During the displacement, the surface of the die is permanently kept at an adjustable temperature, so that the binder can activate its adhesiveness. As soon as the patch 40 contacts the surface the binder material 38 cools down and becomes solid. Then, under the control of the control device 44, the blow-off pulse in the suction device of the laying die 168 is output causing the laying die to move away and thereafter return to its initial position. Here the separating properties of the silicone are beneficial, because there is not any binder material 38 remaining on the die.

By means of a third drive unit, which in the illustrated embodiment is constituted by a stepping motor 190 including a spline shaft system 191, the laying die 168 can be rotated. Accordingly it is possible to even produce traces of inclined patches 40 without requiring the entire laying head (e.g. the laying die 168 including the mechanical lay-up system 184) being rotated.

To achieve an economic laying process a very high cycle time of more than two laying operations per second has been planned. Five laying operations per second or even more are performed for example. With a patch length of 60 mm and using a 12 k roving, a fiber throughput of theoretically 14.4 g/min is achieved. If it is intended for instance to cover one square meter with fiber patches 40 having the thickness of a biaxial laying (approximately 500 g/m$^2$), the preform manufacturing device 10 would require 35 minutes. Shorter times are possible by using several laying devices 28 in conjunction with several robots working together on one surface.

Because of the relatively low achievable speeds, the FPP technique in its currently presented form is still mainly applied for the reinforcement of other types of preforms and for thin-walled and complex components, for example the reinforcement of the rims of holes in multi-axial layings or fabrics. A window funnel, the preform 192 thereof is shown in FIG. 13, could also be produced with a very thin wall and with a defined fiber layer.

Certain types of preforms require less degrees of freedom in a FPP system—preform manufacturing device 10. If it is only reinforcement profiles that are to be produced, the individual modules could be simplified and combined into one production line. Modules which are not required could be omitted. Alternatively, the device could be separated in several modules including intermediate storage of the semi-finished material.

This would help to reduce system costs and to increase productivity.

What is claimed is:

1. A laying device configured to lay fiber pieces comprising:
    an elastically deformable surface being configured to press fiber pieces in a two-dimensional fashion against a curved forming surface, the elastically deformable surface being formed on an elastic carrier which includes a block from an elastomer that is made from silicone that is wetted with a softener.

2. The laying device according to claim 1, further comprising
    a laying head, the elastically deformable surface being arranged on the elastic carrier of the laying head, the laying head being movable between at least one pickup position pick up at least one fiber piece and at least one predetermined position to place the picked up at least one fiber piece.

3. The laying device according to claim 1, further comprising
    a holding device that holds a fiber piece in a releasable fashion against the elastically deformable surface.

4. The laying device according to claim 3, wherein
the holding device includes a pneumatic system by which the fiber piece is configured to be drawn against and/or blown off the elastically deformable surface.

5. The laying device according to claim 1, further comprising
an activation device that activates a binder material to fix the fiber piece pieces at placement positions.

6. The laying device according to claim 1, further comprising
a heating device that heats one of the fiber pieces applied against the elastically deformable surface.

7. The laying device according to claim 6, further comprising
at least one flexible electric power line, the heating device being configured as an electric heating device, the at least one flexible electric power line being electrically connected to the heating device.

8. The laying device according to claim 1, wherein
the elastically deformable surface is formed on an elastic carrier.

9. The laying device according to claim 7, wherein
the at least one electric power line includes at least one carbon yarn passed through the elastic carrier.

10. The laying device according to claim 1, wherein the elastically deformable surface is formed from an elastomer.

11. The laying device according to claim 10, wherein the elastomer is made from silicone.

12. The laying device according to claim 10, wherein metal portions are admixed to the elastomer.

13. The laying device according to claim 12, wherein
the elastomer contains at least in the region of the elastically deformable surface 10 to 25 percent by weight of light metal powder.

14. The laying device according to claim 1, wherein
the elastically deformable surface is formed from or with an antistatic silicone.

15. The laying device according to claim 10, further comprising
at least one electric heating element that is embedded in the elastomer.

16. The laying device according to claim 8, further comprising
a holding device that holds a fiber piece in a releasable fashion against the elastically deformable surface, the holding device includes a pneumatic system by which the fiber piece is configured to be drawn against and/or blown off the elastically deformable surface, wherein
the elastic carrier has at least one channel that conducts a pressure medium of the pneumatic device to the elastically deformable surface and/or with a distribution system that distributes the pressure medium over the elastically deformable surface.

17. The laying device according to claim 1, wherein
the elastically deformable surface is provided with suction and blow-off channels to attract and blow-off a fiber piece.

18. The laying device according to claim 1, further comprising
a positioning device that moves and positions the elastically deformable surface between at least two predetermined positions.

19. The laying device according to claim 18, wherein
the positioning device is adapted to rotate and to pivot the elastically deformable surface about a rotary shaft that intersects the elastically deformable surface or intersects a plane that is parallel to this surface.

20. The laying device according to claim 18, wherein
a laying die that supports the elastically deformable surface is mountable to the positioning device.

21. The laying device according to claim 20, wherein
the laying die includes a coupling device to couple releasably the laying die to the positioning device.

22. The laying device according to claim 20, wherein
the positioning device includes a mechanical lay-up system that has a first drive unit that drives the laying die in a first direction and a second drive unit that drives the laying die in a second direction different from and approximately perpendicular to the first direction and a robot arm.

23. A laying die configured to be used in the laying device according to claim 1, comprising:
a holding device being configured to hold a fiber piece against the elastically deformable surface.

24. A laying device configured to lay fiber pieces comprising:
an elastically deformable surface being configured to press fiber pieces in a two-dimensional fashion against a curved forming surface, the elastically deformable surface being formed on an elastic carrier; and
a holding device that holds a fiber piece in a releasable fashion against the elastically deformable surface, the holding device including a pneumatic system by which the fiber piece is configured to be drawn against and/or blown off the elastically deformable surface, and the elastic carrier having at least one channel that conducts a pressure medium of the pneumatic device to the elastically deformable surface and/or with a distribution system that distributes the pressure medium over the elastically deformable surface, the channel or distribution system having at least one hollow space that has a gas-permeable supporting structure that uses a suction fleece.

* * * * *

UNITED STATES PATENT AND TRADEMARK OFFICE
CERTIFICATE OF CORRECTION

PATENT NO. : 8,567,469 B2  
APPLICATION NO. : 12/530861  
DATED : October 29, 2013  
INVENTOR(S) : Oliver Meyer et al.

Page 1 of 1

It is certified that error appears in the above-identified patent and that said Letters Patent is hereby corrected as shown below:

In the Specifications

In column 14, line 65, change "wetted" to --netted--.

In the Claims

In column 16, line 55, claim 1, change "wetted" to --netted--.

Signed and Sealed this
Twenty-ninth Day of April, 2014

Michelle K. Lee
*Deputy Director of the United States Patent and Trademark Office*